(12) United States Patent
Ober et al.

(10) Patent No.: US 12,000,138 B2
(45) Date of Patent: **\*Jun. 4, 2024**

(54) METHOD AND APPARATUS FOR PRODUCING A TUBULAR SEALING ELEMENT

(71) Applicant: Hilti Aktiengesellschaft, Schaan (LI)

(72) Inventors: Andreas Ober, Kaufering (DE); Björn Bambach, Kaufering (DE); Walter Braunmüller, Kaufering (DE); Hanin Jildeh, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 201 days.

This patent is subject to a terminal disclaimer.

(21) Appl. No.: 17/438,459

(22) PCT Filed: Mar. 2, 2020

(86) PCT No.: PCT/EP2020/055444
§ 371 (c)(1),
(2) Date: Sep. 12, 2021

(87) PCT Pub. No.: WO2020/182520
PCT Pub. Date: Sep. 17, 2020

(65) Prior Publication Data
US 2022/0186490 A1 Jun. 16, 2022

Related U.S. Application Data

(63) Continuation of application No. 16/353,975, filed on Mar. 14, 2019, now Pat. No. 10,837,169.

(51) Int. Cl.
*E04B 1/68* (2006.01)
*E04B 1/82* (2006.01)
*E04B 2/96* (2006.01)

(52) U.S. Cl.
CPC .......... *E04B 1/6815* (2013.01); *E04B 1/6806* (2013.01); *E04B 1/82* (2013.01);
(Continued)

(58) Field of Classification Search
CPC ...... E04B 1/6815; E04B 1/6806; E04B 2/965; E04B 1/82; E04B 2001/8245; E04B 2001/6818
See application file for complete search history.

(56) References Cited

U.S. PATENT DOCUMENTS

| | | | |
|---|---|---|---|
| 4,811,529 | A | 3/1989 | Harris et al. |
| 5,794,406 | A | 8/1998 | Reichental et al. |

(Continued)

FOREIGN PATENT DOCUMENTS

| | | |
|---|---|---|
| EP | 3 252 245 | 12/2017 |
| JP | 2007-291834 | 11/2007 |
| JP | 2015-037881 | 2/2015 |

OTHER PUBLICATIONS

International Search Report dated Jun. 4, 2020 in PCT/EP2020/055444, 3 pages.

(Continued)

*Primary Examiner* — Patrick J Maestri
(74) *Attorney, Agent, or Firm* — Grüneberg and Myers PLLC (57) ABSTRACT

A method for producing of a tubular sealing element for sealing a safing slot in a curtain wall construction is described, particularly for sealing the slot with regard to noise, smoke, and fire and if applicable with regard to water, and an apparatus for producing such a tubular sealing element, as well as to the use of the tubular sealing element produced according to the invention for fire-, smoke-, sound- and water-proof sealing of perimeter joints in curtain wall constructions are described. In particular, an improved (Continued)

method for continuous and endless production of a tubular sealing element for different safing slot dimensions is described.

19 Claims, 3 Drawing Sheets

(52) U.S. Cl.
CPC ...... *E04B 2/965* (2013.01); *E04B 2001/6818* (2013.01); *E04B 2001/8245* (2013.01)

(56) References Cited

U.S. PATENT DOCUMENTS

| | | |
|---|---|---|
| 7,600,609 B2 | 10/2009 | Nakamura |
| 8,381,872 B2 | 2/2013 | Alexander et al. |
| 10,501,934 B2 | 12/2019 | Braunmueller et al. |
| 10,597,868 B2 | 3/2020 | Foerg |
| 2007/0227815 A1 | 10/2007 | Nakamura |
| 2011/0048850 A1 | 3/2011 | Alexander et al. |
| 2013/0097948 A1 | 4/2013 | Burgess |
| 2018/0038100 A1 | 2/2018 | Braunmueller et al. |
| 2019/0145094 A1 | 5/2019 | Foerg |

OTHER PUBLICATIONS

Written Opinion dated Jun. 4, 2020 in PCT/EP2020/055444, 6 pages.
U.S. Appl. No. 17/438,451, filed Sep. 12, 2021, Zemler et al.
U.S. Appl. No. 17/438,457, filed Sep. 12, 2021, Zemler et al.

METHOD AND APPARATUS FOR PRODUCING A TUBULAR SEALING ELEMENT

CROSS-REFERENCE TO RELATED APPLICATIONS

This application is the National Stage entry under § 371 of International Application No. PCT/EP2020/055444, filed on Mar. 2, 2020, and which claims the benefit of priority to U.S. application Ser. No. 16/353,975, filed on Mar. 14, 2019. The content of each of these applications is hereby incorporated by reference in its entirely.

BACKGROUND OF THE INVENTION

Field of the Invention

The present invention relates to a method for producing of a tubular sealing element for sealing a safing slot in a curtain wall construction, particularly for sealing the slot with regard to noise, smoke, and fire and if applicable with regard to water, to an apparatus for producing such a tubular sealing element, as well as to the use of the tubular sealing element produced according to the invention for fire-, smoke-, sound- and water-proof sealing of perimeter joints in curtain wall constructions. In particular, the invention relates to an improved method for continuous and endless production of a tubular sealing element for different safing slot dimensions.

DESCRIPTION OF RELATED ART

Curtain walls are generally used and applied in modern building constructions and are the outer covering of said constructions in which the outer walls are non-structural, but merely keep the weather out and the occupants in. Curtain walls are usually made of a lightweight material, reducing construction costs and weight. When glass is used as the curtain wall, a great advantage is that natural light can penetrate deeper within the building.

A curtain wall generally transfers horizontal wind loads that are incident upon it to the main building structure through connections at floors or columns of the building. Curtain walls are designed to resist air and water infiltration, sway induced by wind and seismic forces acting on the building and its own dead load weight forces. Curtain walls differ from store-front systems in that they are designed to span multiple floors, and take into consideration design requirements such as thermal expansion and contraction, building sway and movement, water diversion, and thermal efficiency for cost-effective heating, cooling, and lighting in the building.

There are different types of curtain wall structures, e.g. curtain wall structures having a common curtain wall design including a foil-faced curtain wall insulation, a steel back pan design or which include glass, especially vision glass extending to the finished floor level below.

A typical curtain wall configuration comprises a profiled framework of vertical studs, so called mullions, and horizontal studs, so called transoms. The space between these profiles is either filled with glass panels within the window area or spandrel panels within the front of the floors. A common spandrel design comprises a pre-manufactured metal pan filled with insulating material. The remaining gap between spandrel and floor has to be sealed against fire, smoke and sound and withstand certain movement.

Curtain wall structures including an interior panel such as a back pan or other similar construction which can be of metal or other material extending across the interior surface of a curtain wall are common in modular designs. The interior panels of a curtain wall are generally made from a metal or insulation material which can easily bend, distort or be otherwise deformed when exposed to strong winds or elevated temperatures, such as intensive sunlight or heat, such as in the event of a fire. Bending, distorting or deforming of these interior panels can result in significant problems in attempting to maintain a complete thermal insulation and seal within the safing slots between the outer edges of the floor construction and the exterior curtain wall construction during a storm or fire. In particular, maintaining of a complete thermal insulation and seal at all time during a fire is important to prevent heat, smoke and flames from spreading from one floor to an adjacent floor. Further, it is important to prevent water infiltration as well as to inhibit water transfer within the building structures and to enhance water-tightness of the safing slot sealing system, i.e. in general it is important to enhance the water-stopping properties of the insulation and seal within the safing slot.

The gap between the floor and the interior wall surface of a curtain wall defines a safing slot, also referred to as perimeter slab edge (void) or perimeter joint, extending between the interior wall surface of the curtain wall construction and the outer edge of the floor. This safing slot is essential to slow the passage of fire and combustion gases between floors. Therefore, it is of great importance to improve fire stopping at the safing slot in order to keep heat, smoke and flames from spreading from one floor to an adjacent floor. It is important to note that the firestop at the perimeter slab edge is considered a continuation of the fire-resistance-rating of the floor slab.

In order to obtain certified materials, systems and assemblies used for structural fire-resistance and separation of adjacent spaces to safeguard against the spread of fire and smoke within a building and the spread of fire to or from the building, the International Building Code IBC 2012 provides minimum requirements to safeguard the public health, safety and general welfare of the occupants of new and existing buildings and structures. According to the International Building Code IBC 2012 Section 715.4, voids created at the intersection of the exterior curtain wall assemblies and such floor assemblies shall be sealed with an approved system to prevent the interior spread of fire where fire-resistance-rated floor or floor/ceiling assemblies are required. Such systems shall be securely installed and tested in accordance with ASTM E 2307 to provide an F-rating for a time period at least equal to the fire-resistance-rating of the floor assembly.

There are very few complicated curtain wall systems known that comply with the requirements according to ASTM Designation: E 1399-97 (Reapproved 2005), in particular having a movement classification of class IV. Class IV is a combination of thermal, wind, sway and seismic movement types. These have been tested according to the invention in both horizontal and vertical conditions. The E 1399, Standard Test Method for Cyclic Movement and Measuring the Minimum and Maximum Joint Widths of Architectural Joint Systems, is used for simulation of movements of the ground, such as for example an earthquake, or even movements under high wind load or life load.

However, there is no fire-, smoke-, sound- and water-proof system known that is used in a curtain wall structure that meets above criteria. Additionally, there are a lot of sealing systems known that use only mineral wool for isolating purposes. However, mineral wool itself is not watertight and has to be coated or otherwise impregnated before employing it within a safing slot of a curtain wall structure to prevent water infiltration as well as to inhibit water transfer within the building structures and to enhance water-tightness of the safing slot sealing system. Therefore, there is a need for alternative safing slot filling system, which addresses the above and enhances the water-stopping properties of the insulation and seal within the safing slot and which can be produced cost-effective, and continuous.

Different methods for producing tubular sealing elements, such as profile strands and joint cores, for sealing building joints, particularly connection joints, with regard to noise and smoke are known from the state of the art, such as for example from DE 3038524 A1 and U.S. Pat. No. 2,898,634. DE 102010008570 A1 describes a method for producing a fire-protection joint cord, wherein an intumescent foam flows into a tube and is caused to foam there. Disadvantages in DE 102010008570 A1 are the predetermined diameter of the tube, as well as a backup of the material mass that might occur during the production process or insufficient material mass in the joint cord that is produced.

The systems of the state of the art relate to processes for joint productions for use within drywall constructions, but nor within curtain wall constructions. These processes have additional disadvantages such as, for example, significant time expenditure during production due to complicated cleaning steps of the system or due to complicated refitting, high costs, structure of the joint core or of the tubular sealing element composed of multiple components or complicated construction elements, poor ability to be cut, great weight or very inconvenient installation for building joints, particularly for connection joints.

It is therefore an object of the invention to provide a method for producing a tubular sealing element for sealing a safing slot within a building construction having a curtain wall construction defined by an interior wall surface including at least one vertical and at least one horizontal framing member and at least one floor spatially disposed from the interior wall surface of the curtain wall construction defining the safing slot extending between the interior wall surface of the curtain wall construction and an outer edge of the floor, particularly for sealing them with regard to noise, fire and smoke, and, if applicable, with regard to water, which method avoids the disadvantages of the known methods. In particular, it is an object of the present invention to provide an improved method for continuous and endless production of such a tubular sealing element for different safing slot dimensions.

It is a further object of the present invention to provide an apparatus that allows cost-advantageous, economical, continuous and endless production of such a tubular sealing element.

It is a further object of the present invention to provide use of the tubular sealing element produced according to the invention for acoustical, smoke-proof fire-proof and/or water-proof sealing.

These and other objects that are evident from the following description of the invention are accomplished by the present invention as it is described in the independent claims. The dependent claims relate to preferred embodiments.

SUMMARY OF THE INVENTION

The present invention relates to a method for producing a tubular sealing element for sealing a safing slot in a curtain wall construction, comprising the following steps:

a) providing a first film on a conveyor belt,
b) applying a reaction mixture capable of flow on a top side of the first film,
c) providing a second film over the applied reaction mixture and over a first and a second side edge region of the first film,
d) connecting a first side edge region of the second film with the first side edge region of the first film, and connecting a second side edge region of the second film with the second side edge region of the first film, to produce an essentially cylindrical tubular sealing element with a first and a second connection area, wherein the volume of the reaction mixture capable of flow to be applied is metered in such a manner that it corresponds to the inside volume of the tubular sealing element produced, in the reacted state, and
wherein parts of the first film and parts of the second film completely enclose the reaction mixture.

The present invention furthermore relates to an apparatus for producing a tubular sealing element, for sealing a safing slot in a curtain wall construction, having a casting system for mixing and applying a reaction mixture capable of flow, comprising a) a first feed apparatus for supplying a first film,
b) a second feed apparatus for supplying a second film,
c) at least one conveying means for laying the first and second film flat and conveying it,
d) a shaping shoulder for shaping the first film,
e) a metering system for applying a reaction mixture capable of flow,
f) a thermal welding system for connecting a first side edge region of the second film with the first side edge region of the first film, and connecting a second side edge region of the second film with the second side edge region of the first film,
g) a reaction segment for allowing the reaction mixture capable of flow to foam, and
h) conveying technology for precise guidance of the films.

Furthermore, the present invention relates to use of the tubular sealing element produced according to the invention for fire-, smoke-, sound- and water-proof sealing of perimeter joints in curtain wall constructions.

Other objects and characteristics of this invention are obvious, in part, and are explained hereinafter, in part.

BRIEF DESCRIPTION OF THE FIGURES

The subject matter of the present invention is further described in more detail by reference to the following figures.

DETAILED DESCRIPTION OF THE INVENTION

The following terms were used within the scope of the present invention:

The term "curtain wall structure" or "curtain wall construction" in context with the present invention refers to a wall structure defined by an interior wall surface including one or more framing members and at least one floor spatially disposed from the interior wall surface of the curtain wall construction. In particular, this refers to curtain a wall structure having a common curtain wall design including foil-faced curtain wall insulation, a steel back pan design or which includes glass, especially vision glass extending to the finished floor level below.

The term "safing slot" in context with the present invention refers to the gap between a floor and the interior wall surface of the curtain wall construction as defined above; it is also referred to as "perimeter slab edge" or "perimeter joint", extending between the interior wall surface of the curtain wall construction and the outer edge of the floor.

The term "interior wall surface" in context with the present invention refers to the inner facing surface of the curtain wall construction as defined above, for example to the inner facing surface of the infilled vision glass and the inner facing surface of the framing members.

The term "connection area", also considered as an "attachment area", in context with the present invention refers to from the main body of the tubular sealing element outwardly projecting flexible wings or tabs, which constitute of parts of the bottom side cover and the top side cover (wing-like), which surround the foam material (main body). The connection areas are preferably positioned at upper corners of the main body in an area where the bottom side cover is connected to the top side cover.

The term "enhancing water-stopping properties" in context with the present invention refers to the prevention of water infiltration as well as to inhibition of water transfer within the building structures and to enhancing water-tightness of the safing slot sealing system.

The term "intumescence" within the scope of the present invention means, in this regard, that the material expands under the effect of heat, for example in the event of a fire, and forms an insulating layer composed of flame-retardant material, in other words it intumesces.

The terms "has/have," "having," and "has/have" are supposed to be inclusive and mean that other elements aside from those mentioned can also be intended.

Used within the scope of the present invention, the singular forms "a" and "an" also include the corresponding plural forms, unless the context clearly permits a different conclusion. Therefore the term "a," for example, is supposed to mean "one or more" or "at least one," unless indicated otherwise.

In one aspect, the present invention relates to a method for producing a tubular sealing element for sealing a safing slot in a curtain wall construction, comprising the following steps:
a) providing a first film on a conveyor belt,
b) applying a reaction mixture capable of flow on a top side of the first film,
c) providing a second film over the applied reaction mixture and over a first and a second side edge region of the first film,
d) connecting a first side edge region of the second film with the first side edge region of the first film, and connecting a second side edge region of the second film with the second side edge region of the first film, to produce an essentially cylindrical tubular sealing element with a first and a second connection area, wherein the volume of the reaction mixture capable of flow to be applied is metered in such a manner that it corresponds to the inside volume of the tubular sealing element produced, in the reacted state, and
wherein parts of the first film and parts of the second film completely enclose the reaction mixture.

In a further aspect, the present invention relates to an apparatus for producing a tubular sealing element, for sealing a safing slot in a curtain wall construction, having a casting system for mixing and applying a reaction mixture capable of flow, comprising
a) a first feed apparatus for supplying a first film,
b) a second feed apparatus for supplying a second film,
c) at least one conveying means for laying the first and second film flat and conveying it,
d) a shaping shoulder for shaping the first film,
e) a metering system for applying a reaction mixture capable of flow,
f) a thermal welding system for connecting a first side edge region of the second film with the first side edge region of the first film, and connecting a second side edge region of the second film with the second side edge region of the first film,
g) a reaction segment for allowing the reaction mixture capable of flow to foam, and
h) conveying technology for precise guidance of the films.

In yet another aspect, the present invention relates to use of the tubular sealing element produced according to the invention for fire-, smoke-, sound- and water-proof sealing of perimeter joints in curtain wall constructions.

Such a tubular sealing element is described in detail in U.S. application Ser. No. 16/353,434, which is incorporated here by making reference to it.

It has been found that the method according to the invention is particularly suitable for producing a tubular sealing element in a simple, continuous, economical and cost-advantageous manner, in order to reliably seal sealing a safing slot in a curtain wall construction, particularly with regard to noise, smoke, and fire and if applicable with regard to water. In particular, the tubular sealing element produced according to the invention can be easily produced with different widths with regard to the cross-sectional form, for application in different safing slot widths by minor modifications of the production line.

Therefore, it is an objective of the present invention to describe the method for producing a tubular sealing element for sealing a safing slot in a curtain wall construction. Furthermore, it is an objective of the present invention to describe the apparatus for producing a tubular sealing element, for sealing a safing slot in a curtain wall construction, in detail. Furthermore, it is an objective of the present invention to describe use of the tubular sealing element produced according to the invention for fire-, smoke-, sound- and water-proof sealing of perimeter joints in curtain wall constructions.

Such a tubular sealing element can be produced, according to the invention, in that a suitable reaction mixture capable of flow is applied to a first film, of which a first side edge region is subsequently connected with a first side edge region of a provided second film, and of which a second side edge region is subsequently connected with a second side edge region of the provided second film, to produce an essentially cylindrical tubular sealing element, wherein the foaming, deformable material passes through a reaction segment, together with the films, and is formed into a tubular sealing element with a first and a second connection area.

For this reason, the method according to the invention, for producing a tubular sealing element for sealing a building joint, comprises the following steps:

a) providing a first film on a conveyor belt,
b) applying a reaction mixture capable of flow on a top side of the first film,
c) providing a second film over the applied reaction mixture and over a first and a second side edge region of the first film,
d) connecting a first side edge region of the second film with the first side edge region of the first film, and connecting a second side edge region of the second film with the second side edge region of the first film, to produce an essentially cylindrical tubular sealing element with a first and a second connection area,
wherein the volume of the reaction mixture capable of flow to be applied is metered in such a manner that it corresponds to the inside volume of the tubular sealing element produced, in the reacted state, and
wherein parts of the first film and parts of the second film completely enclose the reaction mixture.

Furthermore, the method according to the invention comprises the steps:
e) optionally perforating the tubular sealing element,
f) allowing the reaction mixture capable of flow to foam, thereby shaping the desired profile geometry,
g) venting the tubular sealing element, and
h) cutting the tubular sealing element to the desired length.

Furthermore, the method according to the invention comprises the additionally steps of:
i) applying an adhesive layer,
j) optionally creating openings or perforations for water transfer, and
k) optionally welding the outer sides of the connection areas to achieve complete water-tightness.

According to the invention, in a first step of the method, making a first film available takes place by means of a feed apparatus, which may comprise at least one roller, by way of which the first film is supplied from a film supply of a rotating roll. At this step it is optional to perforate the film for venting.

It is practical if the first film provided is a bottom side cover, such as a bottom side laminate. This laminate may comprise at least two layers, preferably comprises three layers. In particular, the bottom side laminate comprises a plastic foil layer, preferably comprising polyethylene, polypropylene or the like, wherein a mesh layer is laminated between the plastic foil layers, most preferably between two polyethylene foil layers. In a most preferred embodiment, the bottom side laminate is a laminate having a glass fibre mesh layer laminated between two polyethylene layers. Alternatively, the bottom side cover may also consist of one or more layers, such as layers or reinforced layers from a woven material, a woven fabric, a foil, a reinforced fiber fabric or the like, or a combination therefrom. The material of the film is preferably a laminate material that does not enter into any adhesion connections with the foam system. When producing the tubular sealing element the film material foaming in the film sheath can also take place in a support mold, which determines the outer contour of the film, which expands during the foaming process.

In a next step of the method according to the invention, the film is laid onto a conveying means, preferably a conveyor belt or belt conveyor, and passed over a shaping shoulder where the side edge regions of the film are set slightly upright, so that the reaction mixture capable of flow can be applied in a next step.

According to the invention, a deformable reaction mixture capable of flow is used in the method. In this regard, the material can be either plastically or elastically deformable. Preferably, the deformable reaction mixture capable of flow is a polyethylene mixture, a polyurethane mixture or a cellular rubber mixture. In particular, the finished tubular sealing element consists of a material that is capable of recovery after compression, such as, for example, foam material, foam rubber, cellular rubber or the like. Possible foam materials that can be mentioned are usual foam materials such as polyethylene foam material and polyurethane foam material or cellular rubber. In this regard, the foam material can be an open-cell foam material with very low air passage resistance, also an almost closed-cell foam material with extremely low air passage values. Foam materials having air passage values that lie between the two extreme cases mentioned above can also be used within the scope of the present invention. It is particularly preferred that the reaction mixture capable of flow is a polyurethane mixture, most preferably an intumescent, open-celled foam material based on polyurethane.

It has proven to be advantageous if the tubular sealing element produced according to the method according to the invention consists of a slow-burning foam material, such as, for example, cellular rubber or polyurethane foam, which is sheathed with a film. In the case of a slow-burning foam material, there is no possibility of fire spreading through the foam material. Independent ignition is excluded in the case of the aforementioned foam materials as starting materials. It is advantageous that in the event of a fire, dripping also does not take place. In a temperature range between 500° C. to 800° C., a slow-burning foam material should still possess at least 20%, at least 25%, preferably still at least 30%, between 20% to 60%, between 20% to 40%, preferably between 25% to 30% of its initial volume. Furthermore, in a temperature range between 500° C. to 800° C., a slow-burning foam material should still possess at least 10%, at least 20%, preferably still at least 30%, between 10% to 40%, between 10% to 30%, preferably between 15% to 20% of its initial mass.

Furthermore, the deformable reaction mixture capable of flow can contain corresponding additives if fire-protection properties, such as intumescence, for example, are desired. Under the effect of heat, as in the event of a fire, the material inflates and forms an insulating layer composed of material having low flammability. The formation of a voluminous insulating layer, namely an ash layer, can occur as the result of the chemical reaction of a mixture composed of corresponding compounds coordinated with one another, which react with one another under the effect of heat. Such systems are known to a person skilled in the art under the term chemical intumescence, and can be used according to the invention. Alternatively, the voluminous insulating layer can be formed by means of inflation of a single compound, which releases gases without a chemical reaction between two compounds having taken place, under the effect of heat. Such systems are known to a person skilled in the art under the term physical intumescence and can also be used according to the invention. The two systems can be used alone or together, in each instance, as a combination, according to the invention.

In a most preferred embodiment of the method of the present invention, the reaction mixture capable of flow is an intumescent, open-celled foam material comprising fire-protective additives having improved hydrophobic properties. Preferably, the intumescent, open-celled foam material, is a foam material based on polyurethane. It is preferred, that the thermally resistant flexible foam material has a density in uncompressed state of 90 kg/m$^3$.

The reaction mixture capable of flow can be mixed in an upstream mixing process, for example in a system that is suitable for applying the reaction mixture capable of flow, such as a casting system.

According to the invention, application of the reaction mixture capable of flow takes place by means of uniform orthogonal metering relative to a top side of the film. In particular, it is required, in the production of the tubular sealing element according to the invention, that the reaction mixture capable of flow is metered uniformly orthogonal to the top side of the open film. As a result, backup during the production process that occurs in the material mass in a tube that has already been fabricated, or insufficient material mass in the joint cord that is produced are prevented. Preferably, the volume of the reaction mixture capable of flow that is to be applied is metered in such a manner that it corresponds to the inside volume of the tubular sealing element produced, in the cured state.

According to the invention, in a next step of the method, making a second film available takes place by means of a feed apparatus, which may comprise at least one roller, by way of which the second film is supplied from a film supply of a rotating roll.

It is practical if the second film provided is a top side cover, such as a top side laminate. This laminate may comprise at least two layers, preferably comprises three layers. In particular, the top side laminate comprises an aluminum layer, a plastic foil layer, preferably comprising polyethylene, polypropylene or the like, and a mesh layer. Most preferably, the top side laminate is constituted of a reinforced aluminum layer with a polyethylene backing. Alternatively, the topside cover may also consist of one or more layers, such as layers or reinforced layers from a woven material, a woven fabric, a foil, a reinforced fiber fabric or the like, or a combination therefrom.

The bottom side cover and the top side cover can be of different or of the same materials depending on the material properties and intended function. However, it is preferred that the bottom side cover and the top side cover are of different materials.

In a particular preferred embodiment of the tubular sealing element, the mesh layer of the bottom side laminate and/or the mesh layer of the top side laminate is made of a glass fiber material or a ceramic fiber material. The fiber mesh is used to retain the foam material in place and enhance stability of the system as well as stabilizes the seal once the thermally resistant flexible foam material has been in contact with fire. The mesh layer of the bottom side laminate and/or the mesh layer of the top side laminate can be laminated between two layers of combustible foil for instance. Further, the mesh layer might be fixed or unfixed. Preferably, the mesh size of the mesh layer of the top side laminate differs from the mesh size of the mesh layer of the bottom side laminate. Preferably, the mesh sizes range in between of about 2 mm×2 mm to about 10 mm×10 mm, more preferably are about 5 mm×5 mm.

The second film is provided over the applied reaction mixture and over a first and a second side edge region of the first film.

In a next step of the method connection of the films takes place and enchasing the reaction mixture by the films. In particular, the method comprises the step of connecting a first side edge region of the second film with the first side edge region of the first film, and connecting a second side edge region of the second film with the second side edge region of the first film, to produce an essentially cylindrical tubular sealing element with a first and a second connection area, wherein the volume of the reaction mixture capable of flow to be applied is metered in such a manner that it corresponds to the inside volume of the tubular sealing element produced, in the reacted state, and wherein parts of the first film and parts of the second film completely enclose the reaction mixture.

Preferably, the filled films are passed to a welding system, using conveying technology, where connecting takes place by means of thermal welding, with the formation of a fish fin weld seam. In this regard, the films should completely enclose the reaction mixture.

This tubular sealing element, formed in this way, is subsequently passed over a reaction segment by means of conveying technology, in which segment foaming of the reaction mixture capable of flow takes place. Preferably, foaming of the reaction mixture capable of flow takes place over a time period of 15 to 90 seconds. In a particular embodiment of the method of the present invention, the conveying technology comprises a conveyor belt or a belt conveyer having guide elements, for example nubs or depressions, for precise guidance of the films.

During guidance over the reaction segment, shaping of the desired profile geometry can take place, if applicable. Preferably, the desired profile geometry can be formed by means of at least one conveyor belt or profile.

According to the method, the cross-sectional form of the tubular sealing element is generally of rectangular, trapezoidal, circular shape or U-shaped. Preferably, the cross-sectional form of the tubular sealing element is rectangular shaped. The tubular sealing element can easily be produced with different widths with regard to the cross-sectional form, for application in different safing slot widths in a curtain wall construction, for example the tubular sealing element can be produced in a width of about 3.54 inches (about 90 mm) that is used for a safing slot width of 1.5 inches to 3 inches (38.1 mm-76.2 mm), a width of about 4.53 inches (about 115 mm) that is used for a safing slot width of 2 inches to 4 inches (50.8 mm to 101.6 mm), and further a width of about 5.55 inches (about 141 mm) that is used for a safing slot width of 3 inches to 5 inches (76.2 mm to 127 mm) by adaptation of the conveying means. These different sizes ease installation in that that the tubular sealing element does not need to be force-compressed into the safing slot. In an alternative embodiment with the tubular sealing element having a generally trapezoidal cross-sectional shape, a larger side of the tubular sealing element can be positioned on the curtain wall side and a smaller side of the tubular sealing element might be positioned on the floor side. For example, the tubular sealing element might have a thickness of 3.5 inches on the curtain wall side and a thickness of 2.375 inches on the floor side thereby enhancing fire-stopping. Any other dimensions for a trapezoidal shape are also feasible.

Subsequently, ventilation of the tubular sealing element takes place. This venting can take place by either perforation of the films by means of a perforation unit or by venting the element via the connection areas before welding, in order to allow the reaction gases to escape and the pressure that has built up to dissipate. This ventilation prevents the film mantle from coming loose from the foam and inflating. Ventilation can also take place by means of pricking small openings into the film, for example using a needle or needle roll, or by means of slit punching or hole punching. Preferably, perforation of the film takes place by means of a rotating roll having applied needles. It is also possible to perforate the tubular sealing element at a later production step again, to accelerate exit of the resulting gases, which are predominantly $CO_2$. This reopening has the consequence that the gases do not have to bleed slowly through the foam via the small first perforations that serve for venting in the first process step, but can quickly exit, and an uncontrolled/unintentional inflation or detachment of the film when leaving the reaction segment is avoided. Hereby, the process time is significantly shortened. Venting of the tubular sealing element allows ambient air enclosed in the film tube and reaction gases that occur during the foaming reaction of the reaction mixture capable of flow to escape, and thereby prevents gas inclusions that can cause bubble formation within the tubular sealing element or under the film. By means of perforation and thereby the possibility of gas escape, uniform shaping is ensured.

Furthermore, the method can also comprise the step of applying an adhesive layer to the tubular sealing element, if desired. Application of the adhesive layer is preferably performed by an adhesive feed apparatus, such as a hot-melt adhesive gun. In a preferred embodiment, the adhesive layer is positioned at the first connection area and/or the second connection area, wherein the adhesive layer may be positioned on an upper or on a lower side of the connection areas. Most preferred the adhesive layer is applied on the lower side of the connection areas. It is preferred, that the adhesive layer is a hot-melt adhesive, a butyl sealing, a double sided adhesive or a self-adhesive layer. In a preferred embodiment, the adhesive layer applied, including an adhesive backer, is a hot-melt self-adhesive layer. In a most preferred embodiment, the adhesive baker is a silicone paper.

Furthermore, the method can also comprise the step of creating openings or perforations for water transfer into the second film. Creation of these openings or perforations can be performed by pricking small openings into the film, by applying a laser, by perforating with a needle, slit punching or hole punching, cutting or the like. In a preferred embodiment, openings or perforations are created on a bottom side cover of the tubular sealing element for water transfer from an inner side of the tubular sealing element to the outside in case where water has been infiltrated into the building structures and hence into the sealing element, whereas the top side cover preferably does not contain perforations or openings to prevent water entry from the top side by for example rain. In an alternative embodiment, the outer surface of the top side cover is convex.

Furthermore, the method can also comprise the step of welding the outer sides of the connection areas to achieve complete water-tightness if desired.

In conclusion, the finished tubular sealing element is passed to a cutting unit, if applicable, where cutting the tubular sealing element to the desired length takes place, if continuous production is not desired. Cutting preferably is performed by a cutter that is synchronized with the production/belt speed. Thus, no deformation and compression of the product is necessary. The cut is preferably carried out by means of a discus blade sitting on a planetary gear. Synchronously with the cut and product, a moving kerf is created in the underlying belt by deflecting the belt by preferably three rollers. These three rollers are optimally synchronized mechanically with the cutter, possibly also via separate axes.

The method according to the invention thereby allows cost-advantageous, economical, continuous and endless production of tubular sealing elements. The method according to the invention is preferably carried out by means of an apparatus for producing such tubular sealing elements.

Figure 2:
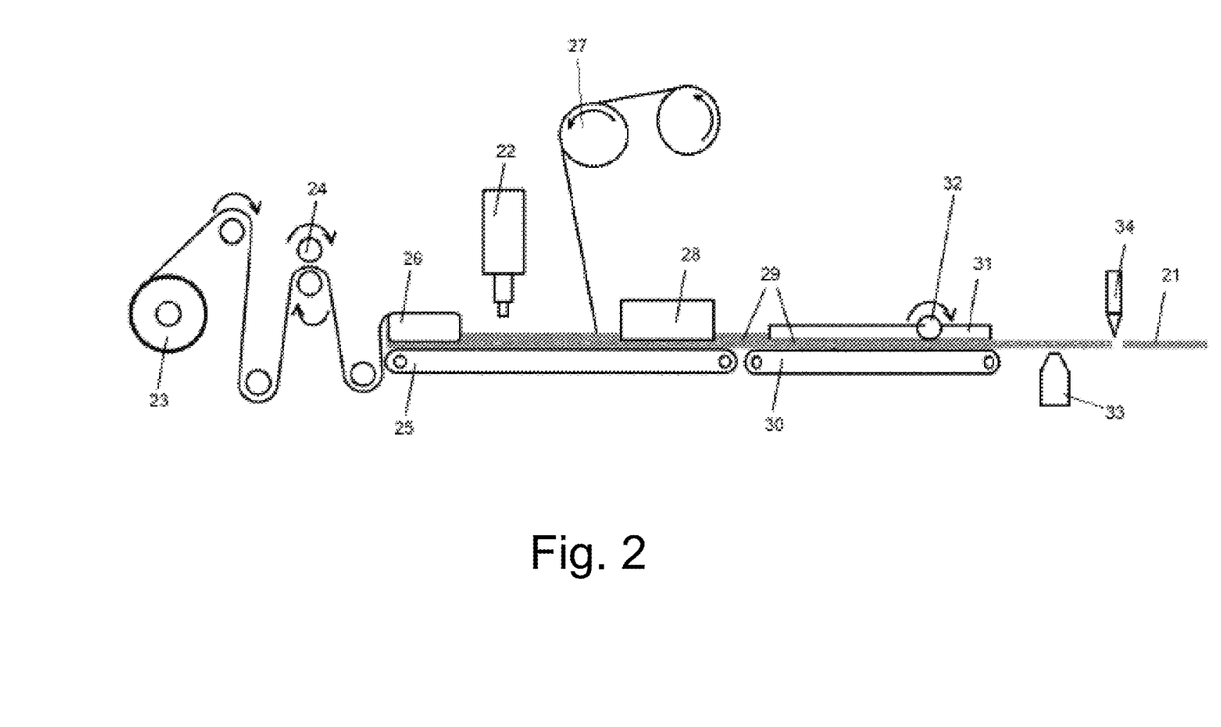
FIG. 2 shows an embodiment of the method and apparatus for production of a tubular sealing element.

In the embodiment of the method and apparatus for production of a tubular sealing element 21 shown in FIG. 2, a film is passed from a feed apparatus, comprising at least one roller 24, by way of which the first film is supplied from a film supply 23 of a rotating roll. In a next step, the film is laid onto a conveying means 25 and passed over a shaping shoulder 26 where the side edge regions of the film are set slightly upright. The reaction mixture is mixed in an upstream mixing process, for example in a system that is suitable for applying the reaction mixture capable of flow, such as a casting system 22. Application of the reaction mixture capable of flow takes place by means of uniform orthogonal metering relative to a top side of the film. A second film is then made available from a second feed apparatus 27. The first and second film are then connected with a thermal welding system 28. This tubular sealing element, formed in this way, is subsequently passed over a reaction segment 29 by means of conveying technology 30. The desired profile geometry can be formed by means of at least one conveyor belt or profile 31. Subsequently, ventilation of the tubular sealing element takes place by perforation of the films by means of a perforation unit 32. An adhesive layer is then applied to a lower side of the connection area of the tubular sealing element by an adhesive feed apparatus 33. Finally, the finished tubular sealing element is passed to a cutting unit 34.

Figure 3:
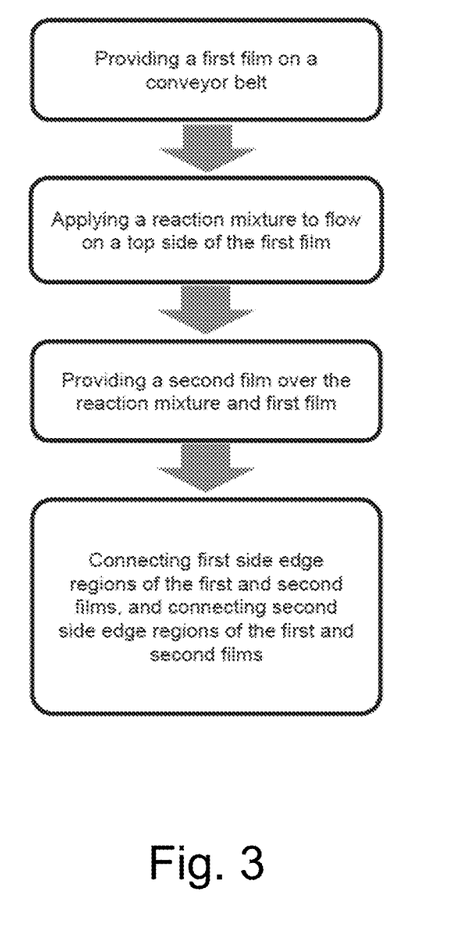
FIG. 3 shows an embodiment of the method for production of a tubular sealing element.

The embodiment of the method as shown in FIG. 3 first involves 210 providing a first film on a conveyor belt. Then, in 211, a reaction mixture is applied to a top side of the first film. In 212, a second film is provided over the applied reaction mixture and over the first film. Then, 213 involves connecting first side edge regions of the first and second films, and connecting second side edge regions of the first and second films.

Such an apparatus for producing a tubular sealing element, for sealing a safing slot in a curtain wall construction, having a casting system for mixing and applying a reaction mixture capable of flow, comprising
 a) a first feed apparatus for supplying a first film,
 b) a second feed apparatus for supplying a second film,
 c) at least one conveying means for laying the first and second film flat and conveying it,
 d) a shaping shoulder for shaping the first film,
 e) a metering system for applying a reaction mixture capable of flow,
 f) a welding system for connecting a first side edge region of the second film with the first side edge region of the first film, and connecting a second side edge region of the second film with the second side edge region of the first film,
 g) a reaction segment for allowing the reaction mixture capable of flow to foam, and
 h) conveying technology for precise guidance of the films.

Preferably, the first feed apparatus for supplying the first film comprises at least one roller. Further preferably, the conveying technology for precise guidance of the film comprises a conveyor belt or belt conveyor having guide elements. Preferably, the conveyor belt or profile for shaping the desired profile geometry can be given any desired shape, or any desired shape can be produced by the conveyor belt or profile, and thereby the profile geometry of the tubular sealing element can be predetermined.

Furthermore, the apparatus comprises a second feed apparatus for supplying a second film in form of a roller.

The conveying technology encompasses at least one conveyor belt or profile for shaping the desired profile geometry as well as means for precise guidance of the films such as rollers, nubs and the like.

The apparatus according to the present invention, may further comprise i) at least one perforation unit for venting the tubular sealing element, j) an adhesive feed apparatus, k) optionally an unit for creating openings or perforations for water transfer, l) optionally welding the outer sides of the connection areas to achieve complete water-tightness, and m) a cutting unit for cutting the tubular sealing element to the desired length.

A particular embodiment of the tubular sealing element produced according to the invention, comprises a thermally resistant flexible foam material for insulating and sealing, the tubular sealing element is for positioning in the safing slot, wherein the tubular sealing element includes a bottom side cover; a top side cover; whereby the top side cover is connected at two positions, spatially disposed from each other, to the bottom side cover; and whereby the bottom side cover and the top side cover surround the thermally resistant flexible foam material; a first connection area for attaching the tubular sealing element to the interior wall surface of the curtain wall construction; and a second connection area for attaching the tubular sealing element to the outer edge of the floor. Preferably, the tubular sealing element produced according to the invention is used for sealing a safing slot in a curtain wall construction, particularly for sealing the slot with regard to noise, smoke, and fire and if applicable with regard to water. Such a tubular sealing element is described in detail in U.S. application Ser. No. 16/353,434, which is incorporated here by making reference to it.

The dimension and profile geometry as well as the materials of the tubular sealing element produced according to the invention are selected in accordance with the planned use of the tubular sealing element and can easily be implemented by means of the method according to the invention.

Positioning of the tubular sealing element produced according to the invention on one or more components can take place in one step. Such installation of the tubular sealing element produced according to the present invention within a curtain wall construction, is described in detail in U.S. application Ser. No. 16/353,856, which is incorporated here by making reference to it.

Figure 1:
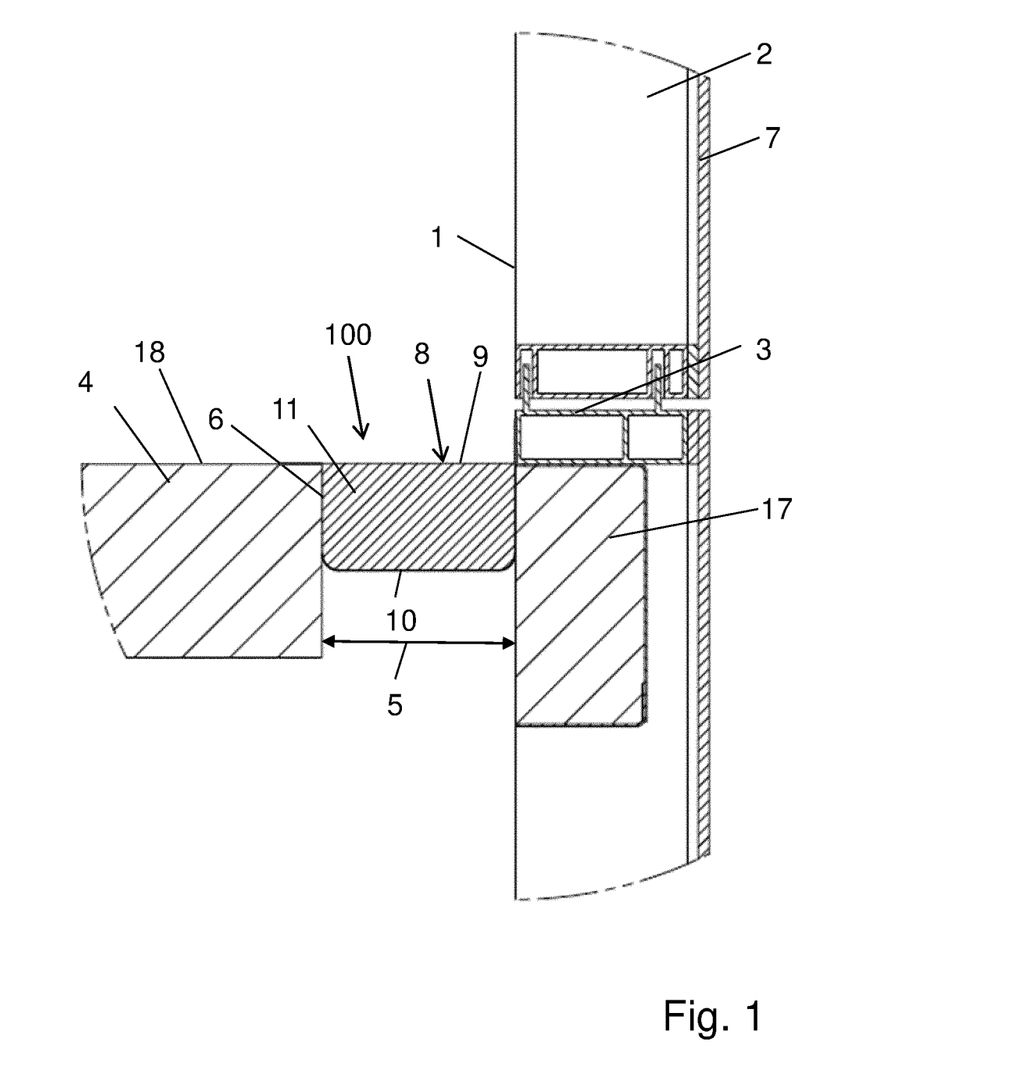
FIG. 1 shows a side cross-sectional view of an embodiment of the tubular sealing element produced according to the present invention arranged between the outer edge of a floor and the interior wall surface of the curtain wall construction, when initially installed and attached to a horizontal framing member (transom at floor level, i.e. zero spandrel) in a curtain wall construction, wherein the vision glass extends to the finished floor level below.

Without restricting the scope of protection of the invention, the invention will be described in greater detail using FIG. 1, which shows a side cross-sectional view of an embodiment of the tubular sealing element produced according to the present invention arranged between the outer edge of a floor and the interior wall surface of the curtain wall construction, when initially installed and attached to a horizontal framing member (transom at floor level, i.e. zero spandrel) in a curtain wall construction, wherein the vision glass extends to the finished floor level below. In particular, the dynamic, thermally insulating and sealing system 100 is initially installed in the area of a zero spandrel area of a glass curtain wall construction, defined by an interior wall surface 1 including one or more framing members, i.e., vertical framing member—mullion 2—and horizontal framing member—transom 3—which is located at the floor level, and at least one floor 4 spatially disposed from the interior wall surface 1 of the curtain wall construction defining a safing slot 5 extending between the interior wall surface 1 of the curtain wall construction and an outer edge 6 of the floor 4. The framing members 2 and 3 are infilled with vision glass 7 extending to the finished floor level below. The dynamic, thermally insulating and sealing system 100 of the present invention has a tubular sealing element 8 comprising a top side cover 9 and a bottom side cover 10 which together surround a thermally resistant flexible foam material 11. The foam material is an intumescent foam material on a polyurethane base with a certain percentage of fire-protective additive materials, preferably blowing graphite. During an event of a fire, the intumescent materials will create an ash crust which will provide the fire protective function. The foam composition can be adjusted i.e. density, firestop filler percentage, etc. so that the necessary fire protective function is provided to the safing slot. Preferably, the tubular sealing element 8 has an approximately rectangular cross section with an upper surface 12, a lower surface 13 being arranged approximately in parallel to each other and a first side surface 14 and a second side surface 15 being arranged approximately in parallel to each other. Preferably, the top side cover 9 is a top side laminate 9, which builds the upper surface 12, whereas the bottom side cover 10 preferably is a bottom side laminate 10, which builds the lower surface 13 and both side surfaces 14 and 15. The thermally resistant flexible foam material 11 is enclosed from the top side cover 9 and the bottom side cover 10, wherein the thermally resistant flexible foam material 11 is connected to inner surfaces of the top side cover 9 and of the bottom side cover 10. When mounted, the first side surface 14 of the tubular sealing element 8 is adjacent to the outer edge 6 of the floor 4 and the second side surface 15 is adjacent to the interior wall surface 1 of the curtain wall construction preferably adjacent to the insulation positioned in a zero-spandrel area 17 of the curtain wall construction. The upper surface 12 of the mounted tubular sealing element 8 is flush with the upper surface 18 of the floor 4. In the present embodiment the tubular sealing element 8 has a smaller height than the floor 4, wherein the height of the tubular sealing element 8 is preferably about half of the height of the floor 4. Not shown in this FIGURE are the first connection area and the second connection area as well as the applied adhesive layers. The adhesive layers are used to adhere the tubular sealing element to the interior wall surface of the curtain wall construction and to the outer edge of the floor.

As is evident from what has been explained above, the method according to the invention is particularly suitable for producing a tubular sealing element fire-, smoke-, sound- and water-proof sealing of perimeter joints in curtain wall constructions, in cost-advantageous, economical, continuous and endless manner.

The method according to the invention and the apparatus according to the invention are particularly characterized by the following advantages as compared with systems of the state of the art:

Because of the uniform orthogonal metering relative to the surface of the film, no contamination of possible process feed lines takes place, because the foam only comes into contact with the film and not with further components of the apparatus. Furthermore, the apparatus allows rapid refitting to other dimensions and diameters of the desired tubular sealing element, for example by replacing the shaping shoulder and adjusting the film width as well as the desired length of the tubular sealing element, without complicated refitting. The method and the apparatus according to the invention allow the production of tubular sealing elements for different safing slot widths, for example the tubular sealing element can be produced in a width of about 3.54 inches (about 90 mm) that is used for a safing slot width of 1.5 inches to 3 inches (38.1 mm-76.2 mm), a width of about 4.53 inches (about 115 mm) that is used for a safing slot width of 2 inches to 4 inches (50.8 mm to 101.6 mm), and further a width of about 5.55 inches (about 141 mm) that is used for a safing slot width of 3 inches to 5 inches (76.2 mm to 127 mm). By means of the tubular sealing element produced according to the invention, a product is made available for different safing slot sizes and applications, which product can furthermore be produced cost-advantageously in a production line.

By means of the flexible use of multiple conveyor belts or profiles, free geometrical configuration of the profile, depending on the desired area of use, can take place. The connection areas of the tubular sealing element produced according to the invention simultaneously serve as an installation aid. This furthermore has the advantage that the tubular sealing element can be installed quickly, and that the foam is protected by the surrounding films from splashing water and during installation.

Furthermore, the method and the apparatus according to the invention prevent backup of the material mass from occurring in a tube that has already been pre-fabricated, during the production process, or prevent insufficient material mass in the safing slot. Furthermore, the mixing quality/homogeneity of the foam is also not influenced by either mixing or shaping.

As is evident from what has been explained above, the tubular sealing element produced according to the invention is particularly suitable for reliably sealing a safing slot in a curtain wall construction, particularly for sealing the slot with regard to noise, smoke, and fire and if applicable with regard to water, in a simple manner.

Furthermore, it has been shown that excellent sealing can be achieved with the tubular sealing element produced according to the invention, because good compressibility of the sealing regions is guaranteed by the selection of the sealing materials and/or the geometrical configuration, without any additional aids. The tubular sealing elements produced according to the invention also allow setting the correct distance from the floor to the curtain wall structure, without additional aids, in order to achieve the aforementioned precompression, by means of a suitable selection of the sealing materials and/or the geometrical configuration, and in particular by choosing the right profile dimension for the corresponding safing slot.

With the tubular sealing element produced according to the invention, it can also be ensured that sufficient material is installed to guarantee excellent sealing with maximal expansion absorption and fire-resistance, and that this is already accomplished by the selection of the sealing materials and/or geometrical configuration.

In view of the above, it is evident that the objects of the invention are accomplished. Because various modifications of the method, the apparatus, the tubular sealing element produced according to the invention, and its use, as described above can be made without deviating from the scope of the invention, the intention is that all the objects contained in the above description are interpreted as illustrations and not in a restrictive sense.

The invention claimed is:

1. A method for producing a tubular sealing element for sealing a building joint, the method comprising:
   a) providing a first film on a conveyor belt,
   b) applying a reaction mixture capable of flow on a top side of the first film,
   c) providing a second film over the applied reaction mixture and over a first and a second side edge region of the first film,
   d) connecting a first side edge region of the second film with the first side edge region of the first film, and connecting a second side edge region of the second film with the second side edge region of the first film, to produce a tubular sealing element with a first connection area and a second connection area, and
   f) shaping a profile geometry, wherein a sealing portion of the profile geometry, in cross section, consists of one sealing region,
   wherein the method further comprises metering flow of the reaction mixture to have a volume corresponding to an inside volume of the tubular sealing element, in a reacted state, and
   wherein parts of the first film and parts of the second film completely enclose the reaction mixture.

2. The method according to claim 1, wherein the sealing region is, in cross section, generally rectangular, trapezoidal, circular, or U-shaped.

3. The method according to claim 1, wherein the sealing region has a generally rectangular cross section having an upper surface, a lower surface, a first side surface, and a second side surface approximately parallel to the first side surface, and optionally with one or more rounded corners.

4. The method according to claim 1, further comprising:
   e) optionally perforating the tubular sealing element,
   f2) allowing the reaction mixture capable of flow to foam, thereby shaping the desired profile geometry,
   g) venting the tubular sealing element, and
   h) cutting the tubular sealing element to the desired length.

5. The method according to claim 1, further comprising:
   i) applying an adhesive layer to connection areas of the tubular sealing element, and either
   j) optionally creating openings or perforations for water transfer, or
   k) optionally welding outer sides of connection areas of the tubular sealing element to enclose the reaction mixture and achieve complete water-tightness.

6. The method according to claim 5, wherein applying the adhesive layer in i) is performed using an adhesive feed apparatus.

7. The method according to claim 5, wherein j) is performed and wherein creating openings or perforations in j) for water transfer is performed by applying a laser.

8. The method according to claim 1, wherein d) comprises a connecting process by thermal welding.

9. The method according to claim 1, wherein the first film and/or the second film comprises a laminate.

10. The method according to claim 1, wherein the reaction mixture capable of flow is an intumescent, open-celled foam material based on polyurethane.

11. The method according to claim 1, wherein the tubular sealing element comprises a thermally resistant flexible foam material for insulating and sealing, wherein the tubular sealing element is sized for positioning in a safing slot, wherein d) comprises forming the tubular sealing element to comprise a bottom side cover and a top side cover, with the top side cover connected at two positions, spatially disposed from each other, to the bottom side cover;
   wherein the method comprises forming the bottom side cover and the top side cover to surround the thermally resistant flexible foam material; and
   wherein the method comprises forming the tubular sealing element to comprise a first connection area for attaching the tubular sealing element to an interior wall surface of the curtain wall construction and a second connection area for attaching the tubular sealing element to an outer edge of the floor in an installed state.

12. The method according to claim 1, further comprising forming the tubular sealing element based on a) to d) to have a continuous length.

13. A tubular sealing element produced according to the method according to claim 1.

14. A method for fire-, smoke-, sound- and water-proof sealing of perimeter joints in a curtain wall construction, the method comprising:
applying the tubular sealing element according to claim 13 to a safing slot.

15. An apparatus for producing a tubular sealing element, for sealing a safing slot in a curtain wall construction, having a casting system for mixing and applying a reaction mixture capable of flow, the apparatus comprising:
  a) a first feed apparatus for supplying a first film,
  a) a second feed apparatus for supplying a second film,
  c) at least one conveyor to lay the first and second film flat and to convey the first and second film,
  d) a shaping shoulder for shaping the first film,
  e) a metering system for applying a reaction mixture capable of flow,
  f) a thermal welding system for connecting a first side edge region of the second film with the first side edge region of the first film, and connecting a second side edge region of the second film with the second side edge region of the first film,
  g) a reaction segment to foam the reaction mixture capable of flow,
  h) a conveyor to guide the films, and
  i) at least one further conveyor belt or profile to shape the tubular sealing element to have a profile geometry, wherein a sealing portion of the profile geometry, in cross section, consists of one sealing region.

16. The apparatus according to claim 15, further comprising
  j) a perforation unit for venting the tubular sealing element,
  k) a perforation unit for perforating the connection element, and
  l) optionally, a cutter to cut the tubular sealing element to a desired length.

17. The apparatus according claim 15, wherein the first feed apparatus and/or the second feed apparatus comprise at least one roll.

18. The apparatus according to claim 15, wherein the conveyor to guide the film comprises a conveyor belt having one or more guide elements.

19. A tubular sealing element, produced using the apparatus according to claim 15.

* * * * *